US010249288B2

(12) United States Patent
Kraft et al.

(10) Patent No.: US 10,249,288 B2
(45) Date of Patent: *Apr. 2, 2019

(54) SOCIAL NETWORKING WITH ASSISTIVE TECHNOLOGY DEVICE

(71) Applicant: International Business Machines Corporation, Armonk, NY (US)

(72) Inventors: Maureen E. Kraft, Hudson, MA (US); Fang Lu, Billerica, MA (US); Azadeh Salehi, Pepperell, MA (US); Weisong Wang, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,429

(22) Filed: Jun. 16, 2018

(65) Prior Publication Data

US 2018/0301139 A1     Oct. 18, 2018

Related U.S. Application Data

(63) Continuation of application No. 15/242,756, filed on Aug. 22, 2016.

(51) Int. Cl.
| | | |
|---|---|---|
| *G10L 13/00* | (2006.01) | |
| *G10L 13/033* | (2013.01) | |
| *G10L 13/10* | (2013.01) | |
| *G06F 17/28* | (2006.01) | |
| *G06F 17/24* | (2006.01) | |
| *G06F 17/21* | (2006.01) | |
| *G09B 21/00* | (2006.01) | |
| *G10L 13/08* | (2013.01) | |

(52) U.S. Cl.
CPC .......... *G10L 13/033* (2013.01); *G06F 17/218* (2013.01); *G06F 17/24* (2013.01); *G06F 17/28* (2013.01); *G09B 21/006* (2013.01); *G10L 13/10* (2013.01)

(58) Field of Classification Search
CPC ....... G10L 13/033; G10L 13/10; G06F 17/24; G06F 17/218; G06F 17/28; G09B 21/006
USPC ........ 704/208, 214, 231, 235, 251, 260, 271
See application file for complete search history.

(56) References Cited

U.S. PATENT DOCUMENTS

| | | |
|---|---|---|
| 7,289,949 B2 | 10/2007 | Warner et al. |
| 7,966,373 B1 | 6/2011 | Smith et al. |

(Continued)

FOREIGN PATENT DOCUMENTS

EP     2747013     6/2014

OTHER PUBLICATIONS

Burnett et al., "Speech Synthesis Markup Language (SSML) Version 1.0," W3C, Sep. 2004, 36 pages.

(Continued)

*Primary Examiner* — Thierry L Pham
(74) *Attorney, Agent, or Firm* — VanLeeuwen & VanLeeuwen; Mercedes L. Hobson (57) ABSTRACT

An approach is provided that assists visually impaired users. The approach analyzes a document that is being utilized by the visually impaired user. The analysis derives a sensitivity of the document. A vocal characteristic corresponding to the derived sensitivity is retrieved. Text from the document is audibly read to the visually impaired user with a text to speech process that utilizes the retrieved vocal characteristic. The retrieved vocal characteristic conveys the derived sensitivity of the document to the visually impaired user.

17 Claims, 7 Drawing Sheets

(56) References Cited

U.S. PATENT DOCUMENTS

| | | |
|---|---|---|
| 9,253,138 B2 | 2/2016 | Bates et al. |
| 2002/0013692 A1 | 1/2002 | Chandhok et al. |
| 2005/0204005 A1 | 9/2005 | Purcell et al. |
| 2007/0078656 A1 | 4/2007 | Niemeyer et al. |
| 2008/0134282 A1 | 6/2008 | Fridman et al. |
| 2009/0249433 A1 | 10/2009 | Misra et al. |
| 2014/0149322 A1 | 5/2014 | Lavoie et al. |
| 2015/0365366 A1 | 12/2015 | Prabhu |
| 2018/0053498 A1 | 2/2018 | Kraft et al. |

OTHER PUBLICATIONS

Craig et al., "Accessible Rich Internet Applications (WAI-ARIA) 1.0," W3C, Mar. 2014, 105 pages.
"List of IBM Patents or Patent Applications Treated as Related," Letter from Leslie A. Van Leeuwen, Jun. 16, 2018, 1 page.

SOCIAL NETWORKING WITH ASSISTIVE TECHNOLOGY DEVICE

BACKGROUND OF THE INVENTION

Technical Field

This disclosure relates to an approach that emphasizes particular textual areas to sight impaired users using screen readers that provide tonal emphasis based on sensitivity levels.

Description of Related Art

Using traditional assistive technology (AT), screen readers are not capable to pro-actively alerting vision-impaired users of the intended audience or sensitivity levels when messages are posted, such as in social networking web sites. In many traditional systems, the visually impaired user has to tab to the privacy level to find out where the message will be posted (e.g., Public, Friends, Only Me, Custom, Close Friends, etc.). If the user presses the Enter key before reading this drop down list, then the message will be posted before the user realizes which audience will be allowed to read the message. This can be harmful if an intended private message is posted to a public group.

SUMMARY

An approach is provided that assists visually impaired users. The approach analyzes a document that is being utilized by the visually impaired user. The analysis derives a sensitivity of the document. A vocal characteristic corresponding to the derived sensitivity is retrieved. Text from the document is audibly read to the visually impaired user with a text to speech process that utilizes the retrieved vocal characteristic. The retrieved vocal characteristic conveys the derived sensitivity of the document to the visually impaired user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-7 describe an approach that enhances the use of assistive technology in the social networking domains by providing users who are vision-impaired with different sound characteristics through screen readers to alert the user before such user posts any messages to the social networking website. In one embodiment, the approach can also provide users different color backgrounds to alert users with visual cues.

By utilizing the specification described in Speech Synthesis Markup Language Specification for the Speech Interface Framework and WAI-ARIA framework, this approach will detect whether the content the user wants to post to the social networking website contains sensitive information. The approach also detects the audience size to which the post will be submitted. In addition, the approach detects the privacy level the message will be submitted to, for example, only me, close friend, custom, friends, public.

In one embodiment, the approach operates by settings different flags based on the message privacy level. In this manner, the approach associates privacy levels with the attributes defined in the Prosody and Style section in the Speech Synthesis Markup Language Specification, in particular, the "<emphasis> markup." For example, the pre-defined rules can associate the public message with <emphasis level="strong"> markup. In this example, the pre-defined rules can associate a message that is shared with all the friends with <emphasis level="moderate"> markup, and can associate a message that is shared with close friends with <emphasis level="none"> markup, and can associate a message that is shared only with the user with <emphasis level="reduced"> markup.

In addition, the approach can set a role="alert" to the text that will be posted so the screen reader can announce as an alert accordingly. At the same time, not all the users use screen readers intensively. For example, different types of styling on the text such as bold, italics, larger font size, underlined font can greatly help the user with different vision issues (e.g., low vision, color blindness, etc.) to use computer software. This invention system associates the pre-defined rules based on the message submission privacy level with different high contrast color.

For example, the pre-defined rules can associate the public message with <h1> heading which displays the message using a larger font.

```
h1 {
    font-size: 4em;
    font-weight: bold;
}
``` the pre-defined rules can associate the message that is shared with all the friends with <h2> heading which displays the messages using the font a bit smaller than <h1> heading:

```
h2 {
    font-size: 3em;
    font-weight: bold;
}
``` the pre-defined rules can further associate the message that is shared with close friends with <h3> heading which displays the messages using the font a bit smaller than <h2> heading.

```
h3 {
    font-size: 2em;
    font-weight: bold;
}
```

Finally, the pre-defined rules can associate the message that is shared only with the user with an <h4> heading which displays the messages using the font a bit smaller than <h3> heading:

```
h4 {
    margin-top: 1em;
    font-weight: bold;
}
```

Below is an example of a transformed markup:

```
<h1 id="sample_alert" role="alert" class="redTextMessage">That is a <emphasis level="strong"> I found a bug in the w3.ibm.com web site </emphasis></h1>
<h2 id="sample_alert" role="alert" class="orangeTextMessage">That is a <emphasis level="moderate"> I must submit the monthly status report today </emphasis></h2>
<h3 id="sample_alert" role="alert" class="greenTextMessage">That is a <emphasis level="none"> I will do a presentation to my team this morning. </emphasis></h3>
<h4 id="sample_alert" role="alert" class="blueTextMessage">That is a <emphasis level="reduced"> I am debugging the code now </emphasis></h4>
```

In the approach described herein, the enhanced screen reader audibly reads the text to the user using different vocal intonations and voices based on the updated attributes, examples of which are shown above. The approach can also display the message using different types of highlighting, such as different font sizes and colors, to alert the user regarding attributes of the content, or message, such as the privacy level and audience size. In addition, the approach can operate on different types of devices, such as mobile smart phones, etc., that have the ability to audibly read text or display text with different highlights.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
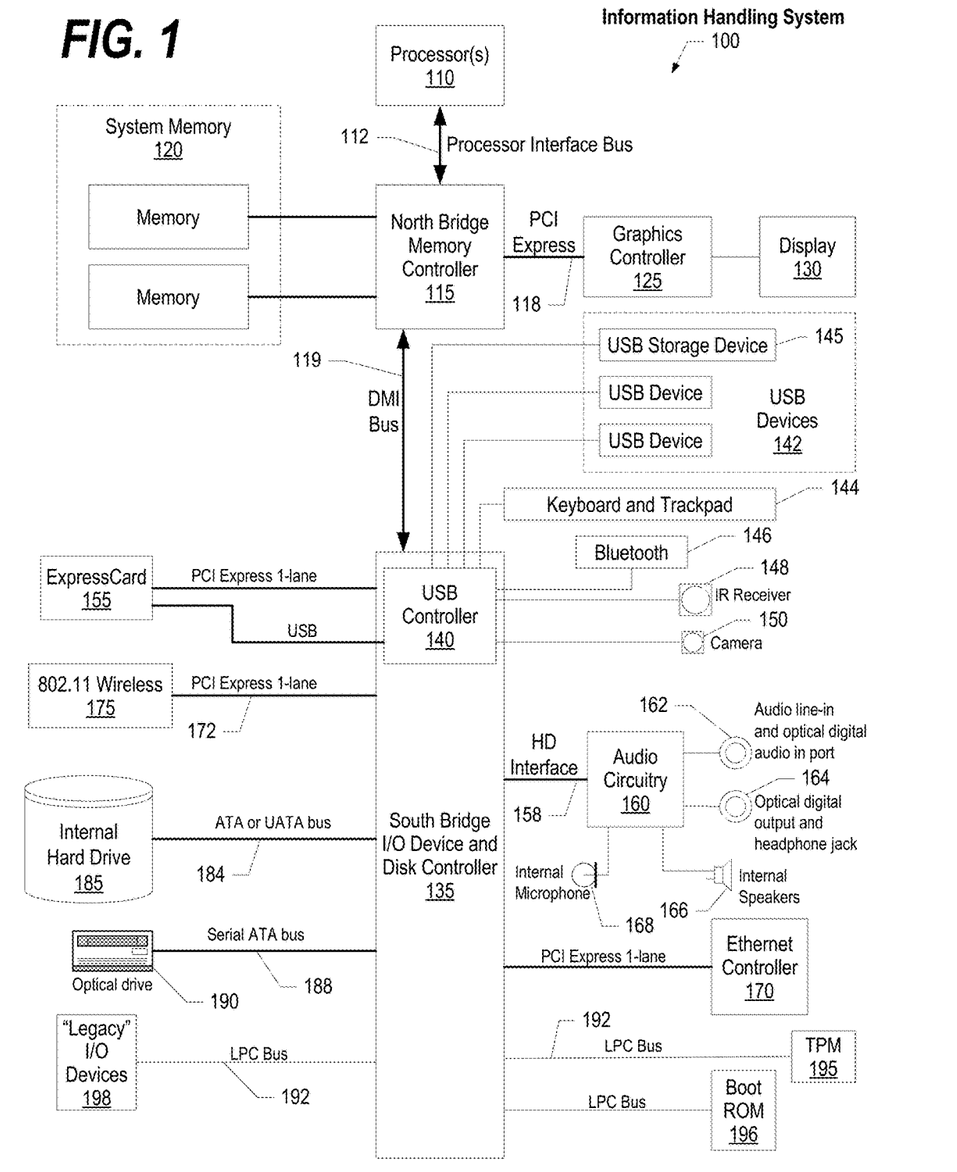
FIG. 1 depicts a block diagram of a processor and components of an information handling system.
Figure 2:
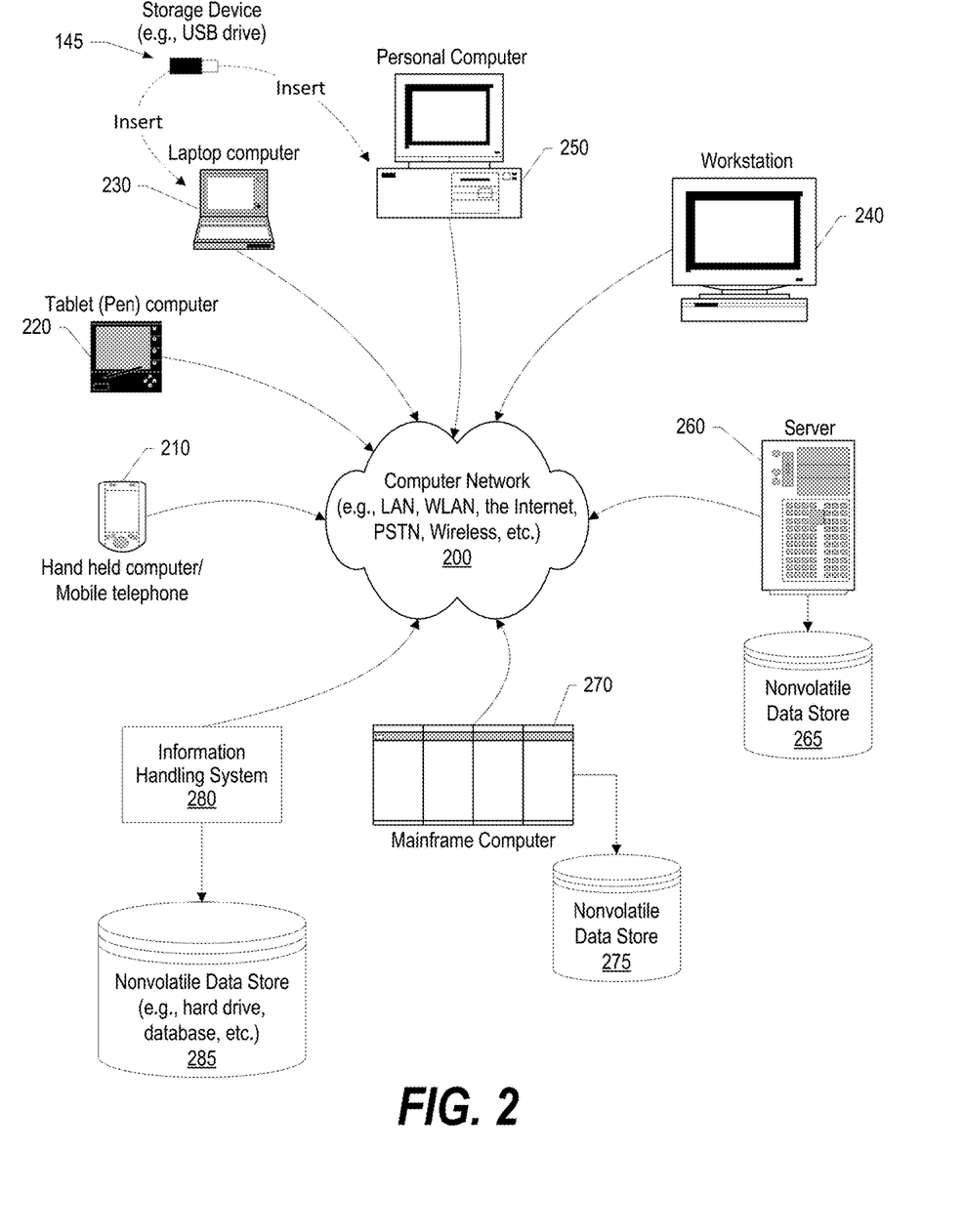
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
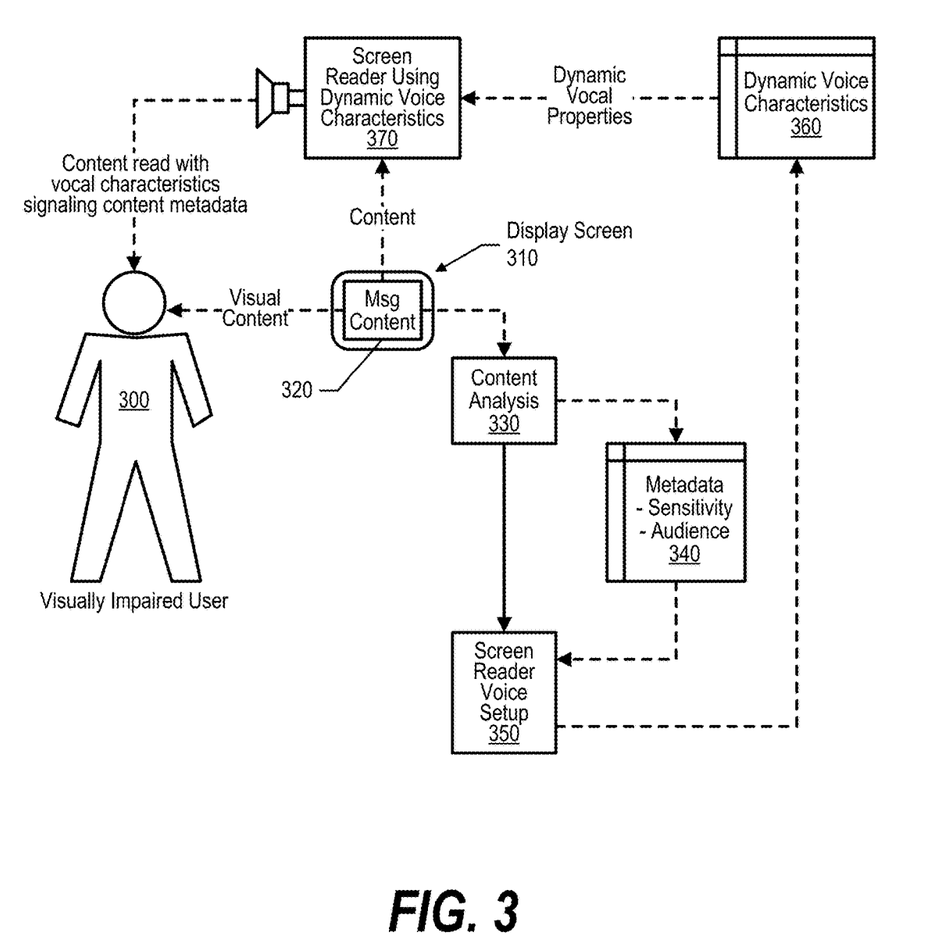
FIG. 3 is a component diagram that depicts the various components used in providing advanced assistive technology to visually impaired users to alert the user of sensitivity and audience issues.

FIG. 3 is a component diagram that depicts the various components used in providing advanced assistive technology to visually impaired users to alert the user of sensitivity and audience issues. User 300 is a visually impaired user that utilizes document 320 on display device 310. In one embodiment, as the user is utilizing the document on display screen 310, content analysis process 330 is repeatedly performed to ascertain characteristics, or metadata, of the document. Metadata pertaining to the document is stored in memory area 350 and can include a sensitivity level of the document (confidential, restricted, etc.), and audience characteristics, such as a size of the intended audience that will receive the document over social media or other computer network means. Audience characteristics can also include a relationship between user 300 and the various audience members (e.g., public, family, friends, colleagues, only the user, etc.).

Content analysis 330 and metadata stored in memory area 340 feed into a text to speech, or screen reader, setup process 350. Setup process 350 determines the audible vocal characteristics that are to be used to read the document, or parts thereof, to the user with such vocal characteristics conveying the metadata pertaining to the document. For example, a male vocal characteristic might be used to convey that the document is sensitive with deeper male voices used to convey further sensitivity while, conversely, a female vocal characteristic might be used to convey that the document is not sensitive with higher female vocal characteristics being used to convey further lack of sensitivity. Other vocal characteristics, such as volume, can be used to convey audience information, such as increasing the volume of the audible vocal characteristic when more individuals are in the audience and reducing the volume when there are fewer audience members. Still more vocal characteristics, such as accents, can be used to convey further metadata, such as relationships between the intended audience and the user. For example, a British accent can be used to convey that the relationship is close (family, friends, etc.), an American accent can be used to convey that the relationship is "Public," and an Australian accent can be used to convey that the relationship is "self" (document only intended for the user). The dynamic vocal characteristics determined by process 350 based on the document metadata are stored in memory area 360.

Text to speech process 370, such as a screen reader, uses the dynamic vocal properties stored in memory area 360 to read text of the document back to the visually impaired user. The content read by the text to speech process has vocal characteristics that indicate, to the user, different attributes of the document, such as the sensitivity, audience size, and audience relationships.

Figure 4:
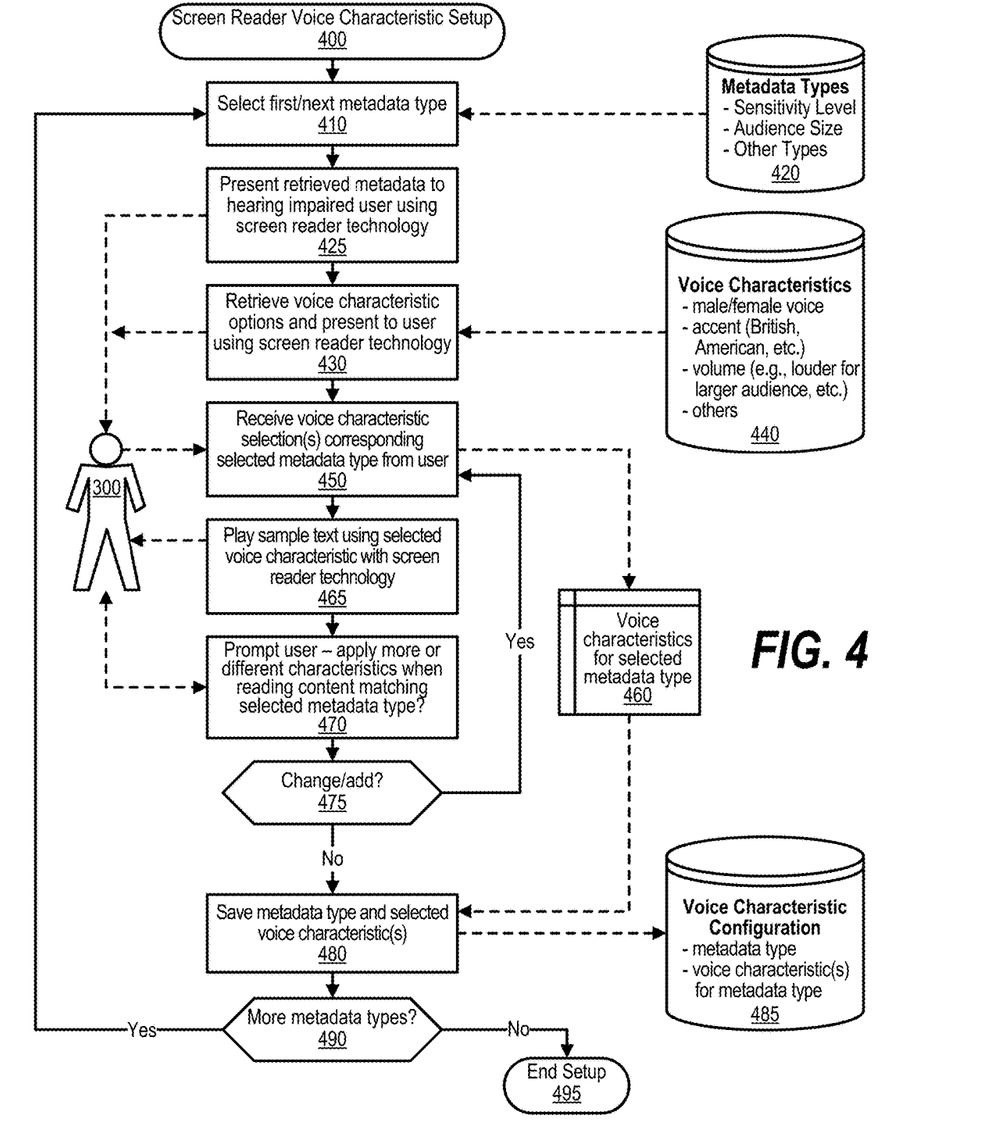
FIG. 4 is a depiction of a flowchart showing steps taken during an enhanced screen reader voice characteristic setup process.

FIG. 4 is a depiction of a flowchart showing steps taken during an enhanced screen reader voice characteristic setup process. FIG. 4 processing commences at 400 and shows the steps taken by a setup process that establishes screen reader voice characteristic preferences. At step 410, the process selects the first metadata type from data store 420. Metadata types can include sensitivity levels, audience size, relationships, and other metadata types. At step 425, the process presents the retrieved metadata to the hearing impaired user that is setting up the enhanced screen reader technology.

At step 430, the process retrieves voice characteristic options from data store 440 and presents the available options to the user that is setting up the enhanced screen reader technology. Voice characteristic options can include male/female voices, accents (British, American, etc.), volume (e.g., louder for larger audience, etc.), and other characteristics. At step 450, the process receives the voice characteristic selection(s) from the user with such selections corresponding to the currently selected metadata type. The voice characteristics selected by the user for the selected metadata type are stored in memory area 460. At step 465, the process plays an audible voice of some sample text using the selected voice characteristics with the screen reader technology, such as reading the text with a male voice in a British accent, etc. At step 470, the process prompts the user as to whether the user wishes to apply more characteristics to the currently selected voice characteristics or change the currently selected characteristics to different characteristics the screen reader is reading content that matches the selected metadata type.

The process determines as to whether the user wants to change or add voice characteristics (decision 475). If the user wants to change or add voice characteristics, then decision 475 branches to the 'yes' branch which loops back to step 450 to receive further voice characteristic selections from the user. This looping continues until the user no longer wants to change or add voice characteristics, at which point decision 475 branches to the 'no' branch exiting the loop.

At step 480, the process retrieves the voice characteristic(s) selected by the user for the selected metadata type from memory area 460 and stores the data in voice characteristic configuration data store 485. Voice characteristic configuration data store 485 includes the metadata types and the voice characteristic(s) selected for each of the metadata types. The process determines as to whether there are more metadata types to select and process as described above (decision 490). If there are more metadata types to select and process, then decision 490 branches to the 'yes' branch which loops back to step 410 to select and process the next metadata type as described above. This looping continues until there are no more metadata types to select, at which point decision 490 branches to the 'no' branch exiting the loop. Screen reader voice characteristic preferences setup shown in FIG. 4 thereafter ends at 495.

Figure 5:
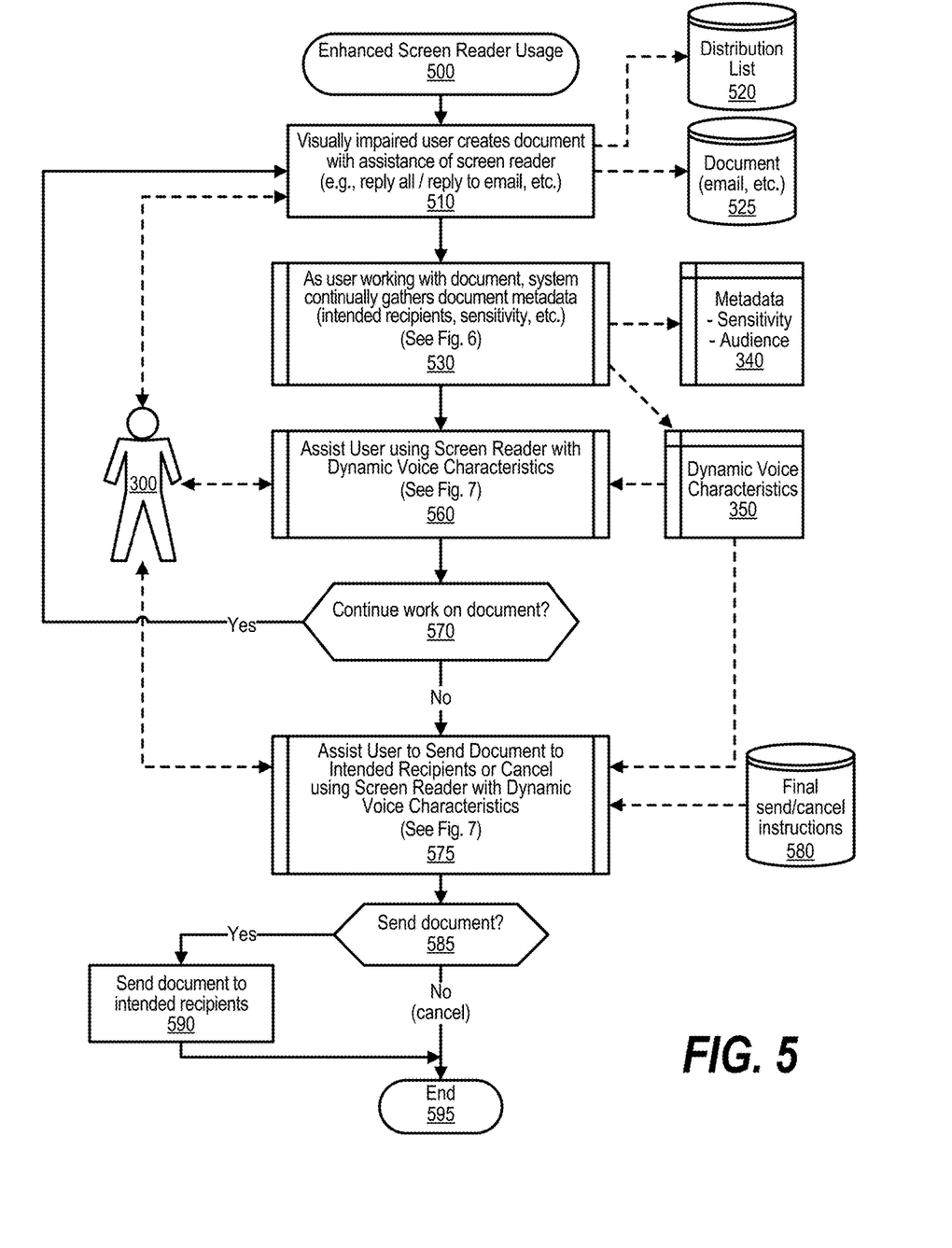
FIG. 5 is a depiction of a flowchart showing steps taken during enhanced screen reader usage.

FIG. 5 is a depiction of a flowchart showing steps taken during enhanced screen reader usage. FIG. 5 processing commences at 500 and shows the steps taken by a process that allows a visually impaired user to utilize the enhanced screen reader. At step 510, the visually impaired user creates document 525 with assistance of the enhanced screen reader (e.g., a standard document, an email message, a reply all/reply to email, blog post, social media post, etc.). The distribution list of the intended recipients of document 525 is stored in data store 520.

At predefined process 530, as the visually impaired user working with document, the process continually gathers document metadata (e.g., intended recipients, sensitivity, etc.) (see FIG. 6 and corresponding text for processing details). Predefined process stores the metadata regarding the document being used by the user in memory area 340 and stores the dynamic voice characteristics used to audibly read the document to the user in memory area 350. The dynamic voice characteristics used to audibly read the document are based on the user's preferences and the metadata pertaining to the document that was stored in memory area 340.

Figure 7:
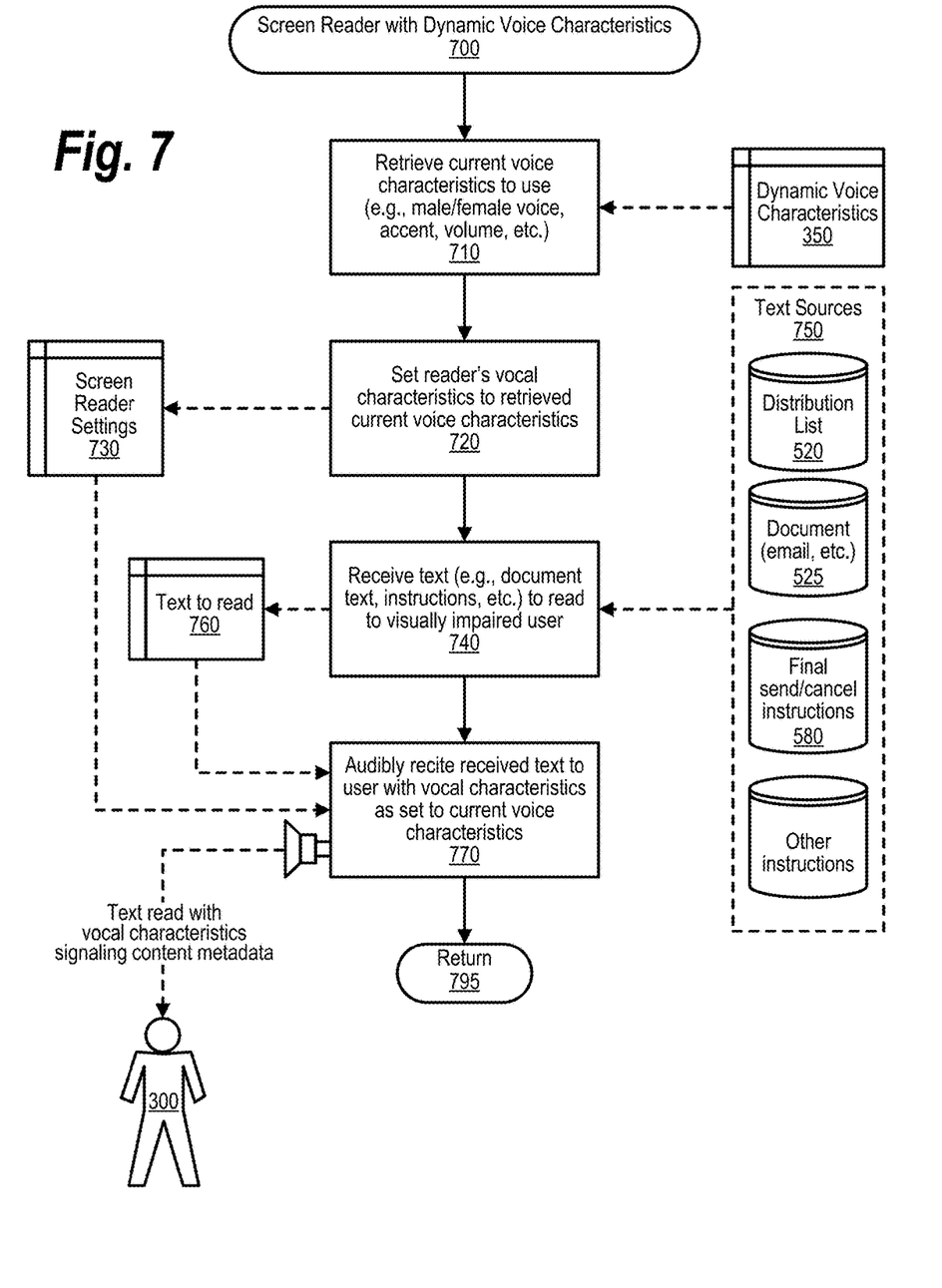
FIG. 7 is a depiction of a flowchart showing the steps taken by the enhanced screen reader that utilizes dynamic voice characteristics to convey sensitivity and audience information to a user.

At predefined process 560, the process performs the Assist User using Screen Reader with Dynamic Voice Characteristics routine (see FIG. 7 and corresponding text for processing details). Predefined process 560 retrieves the dynamic voice characteristics from memory area 350 to read document 525 to user 300 (e.g., using a male voice to signify sensitive information in the document, using a louder voice to signify a larger audience, using an accent to signify a particular relationship between the user and the audience, etc.).

The process determines as to whether the user continues working on the document (decision 570). If the user continues to work on the document, then decision 570 branches to the 'yes' branch which loops back to step 510 to continue work on the document and to continue gathering metadata regarding the document. This looping continues until the user no longer wishes to continue work on the document (e.g., sends the message, save/close the document, posts the document as a message, etc.), at which point decision 570 branches to the 'no' branch exiting the loop.

When the user is finished working on the document then, at predefined process 575, the process performs the Assist User to Send Document to Intended Recipients or Cancel using Screen Reader with Dynamic Voice Characteristics routine (see FIG. 7 and corresponding text for processing details). Predefined process 575 audibly reads text of document 525 to the user using the dynamic voice characteristics saved in memory area 350. In one embodiment, additional instructions regarding sending (or posting) the document or canceling the document are read to the user using the enhanced screen reader with such instructions being read from data store 580.

The process determines as to whether the user wishes to send/post the document (decision 585). If the user wishes to send/post the document, then decision 585 branches to the 'yes' branch whereupon, at step 590, the process sends document to intended recipients (e.g., via an email/text message "send" operation, posting the message to a blog or social media account, etc.). On the other hand, if the user does not wish to send/post the document, then decision 585 branches to the 'no' branch bypassing step 590. FIG. 5 processing thereafter ends at 595.

Figure 6:
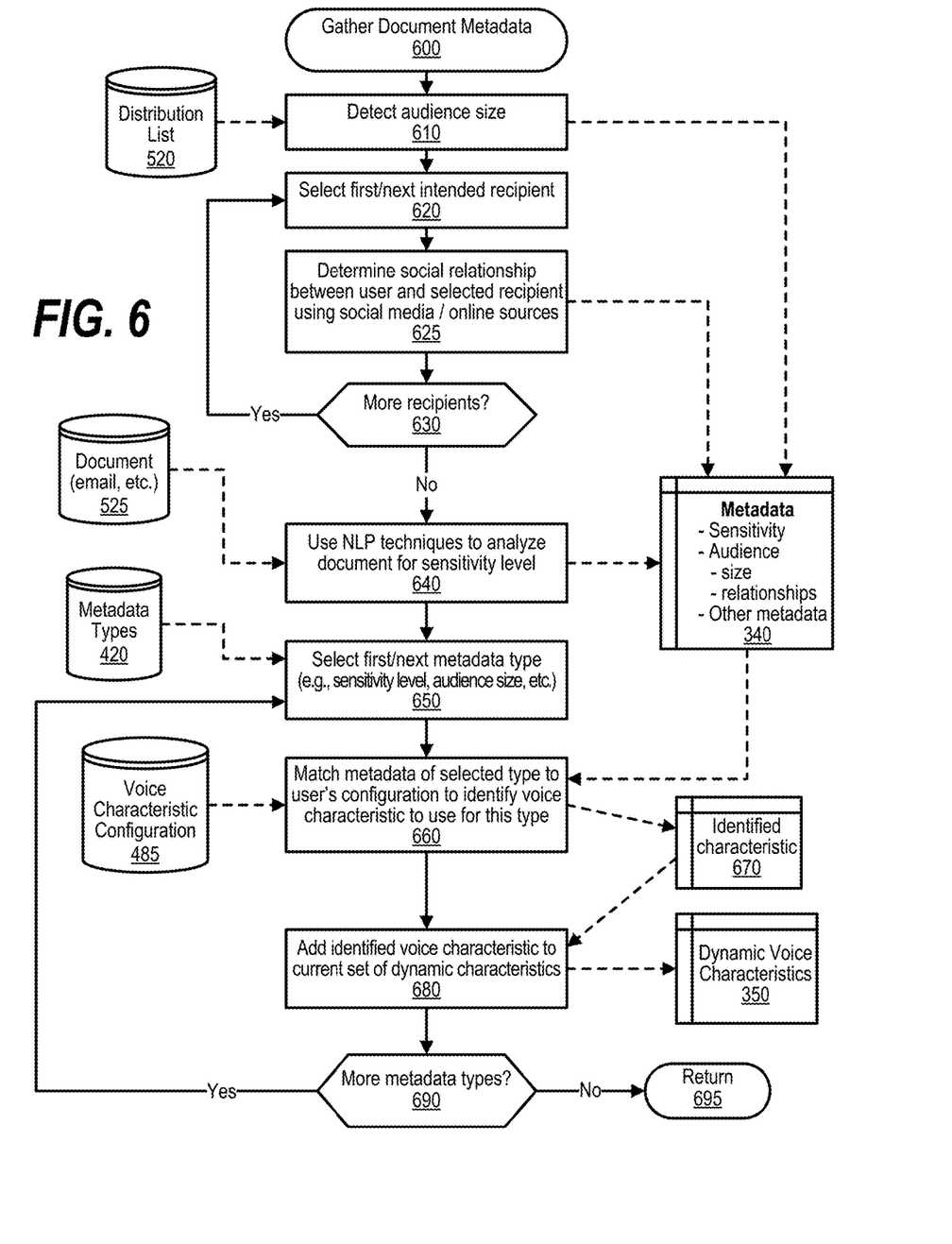
FIG. 6 is a depiction of a flowchart showing the logic used to gather document metadata regarding an intended audience of a document and the sensitivity level of the document.

FIG. 6 is a depiction of a flowchart showing the logic used to gather document metadata regarding an intended audience of a document and the sensitivity level of the document. FIG. 6 processing commences at 600 and shows the steps taken by a process that gathers document metadata from a document that is being utilized by the visually impaired user. At step 610, the process detects the audience size of the document. For example, in an email or text, the audience size can be determined based on the distribution list. In an online post, such as a blog or social media post, the audience size can be determined based on the group to which the message is being posted and any restrictions that have been applied to the group (e.g., only colleagues, family members, everyone, etc.). At step 620, the process selects the first intended recipient from the list of intended recipients. At step 625, the process determines any social relationship between the user that is preparing the document and the selected recipient. The social relationship can be determined using social media data corresponding to the user, other online sources, and profile data related to the user. The relationship determined by step 625 is stored in memory area 340. The process determines whether there are more intended recipients of the document (decision 630). If there are more intended recipients of the document, then decision 630 branches to the 'yes' branch which loops back to step 620 to select and process the next intended recipient. This looping continues until all of the intended recipients have been processed, at which point decision 630 branches to the 'no' branch exiting the loop.

At step 640, the process uses natural language processing (NLP) techniques to analyze the document for sensitivity level. In one embodiment, key words such as "confidential," "private," etc. are detected by step 640. In another embodiment, subject matters discussed in the document are detected and analyzed for possible sensitivity settings (e.g., personal issues, new ventures, etc.). The sensitivity data discovered by step 640 is stored in metadata memory area 340. At step 650, the process selects the first metadata type (e.g., sensitivity level, audience size, relationship, etc.) from data store 420.

At step 660, the process matches the selected metadata type to the user's configuration to identify voice characteristic to use for the selected type. For example, if the metadata type is "sensitivity" and the metadata indicates that the document has a higher sensitivity level (e.g., confidential, etc.), then the configured vocal characteristic might be a male voice. Step 660 stores the identified characteristics in memory area 670. At step 680, the process adds the identified voice characteristic from memory area 670 to the set of current dynamic characteristics that are stored in memory area 350 so that multiple vocal characteristics can be identified and stored to indicate different aspects of the document (e.g., male voice to indicate sensitive information, louder voice to indicate larger audience, and British accent to indicate family relationship between the user and the audience, etc.).

The process determines whether there are more metadata types to process (decision 690). If there are more metadata types to process, then decision 690 branches to the 'yes' branch which loops back to step 650 to select and process the next metadata type as described above. This looping continues until there are no more metadata types to process, at which point decision 690 branches to the 'no' branch exiting the loop. FIG. 6 processing thereafter returns to the calling routine (see FIG. 5) at 695.

FIG. 7 is a depiction of a flowchart showing the steps taken by the enhanced screen reader that utilizes dynamic voice characteristics to convey sensitivity and audience information to a user. FIG. 7 processing commences at 700 and shows the steps taken by a process that provides a screen reader with dynamic voice characteristics. At step 710, the process retrieves the current voice characteristics to use when reading text to the user (e.g., male/female voice, vocal accent, volume, etc.). At step 720, the process sets the reader's vocal characteristics to the retrieved current voice characteristics. The screen reader's settings are stored in memory area 730.

At step 740, the process receives text to be audibly read to visually impaired user 300. Types of document related text that can be read include distribution list data 520, actual document text 520, final send/cancel instructions 580, and any other document related text or instructions. The text to be read is stored in memory area 760. At step 770, the process retrieves the text to be read from memory area 760 and audibly recites the retrieved text to user 300 using the vocal characteristics as set to current screen reader voice characteristics in screen reader settings 730. FIG. 7 processing thereafter returns to the calling routine (see FIG. 5) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   analyzing, by the processor, a document that is being composed by a visually impaired user, wherein the analysis derives a sensitivity of the document;
   retrieving, from the memory, a vocal characteristic corresponding to the derived sensitivity based on one or more predefined settings;
   retrieving, from the memory, an additional vocal characteristic corresponding to a size of an audience intended to receive the document; and
   audibly reading text from the document to the visually impaired user with a text to speech process utilizing both the retrieved vocal characteristic and the additional vocal characteristic.

2. The method of claim 1 wherein the vocal characteristic is a speaker gender and the additional vocal characteristic is a speaker volume.

3. The method of claim 1 wherein the analyzing further detects an intended message that includes the document and an audience relationship between the visually impaired user and one or more members of the audience, and wherein the additional voice characteristic also corresponds to the audience relationship.

4. The method of claim 1 wherein the derived sensitivity is based on one or more aspects from a group that includes confidentiality, offensiveness, social convention, ethnicity, and age.

5. The method of claim 1 wherein the document is a message intended to be sent to one or more recipients in a social networking system, the method further comprising:
   receiving the document from the visually impaired user;
   applying one or more natural language processing (NLP) techniques to derive the sensitivity of the document;
   marking one or more areas of the document with one or more document tags that indicate the derived sensitivity of the corresponding areas;
   retrieving the vocal characteristic corresponding to the derived sensitivity and a second vocal characteristic corresponding to non-sensitive areas of the document; and
   wherein the audibly reading of the text includes reading the areas marked with the document tags with the vocal characteristics that correspond to the derived sensitivity, and reading the areas not marked with the document tags with the second vocal characteristics.

6. The method of claim 5 wherein the social networking system is selected from a group consisting of an instant messaging (IM) system, a short message services (SMS) system, a blog-based system, a website, a social media community system, a news feed system, an email system, and a voice-over IP (VoIP) system.

7. An information handling system comprising:
   one or more processors;
   a memory coupled to at least one of the processors; and a set of computer program instructions stored in the memory and executed by at least one of the processors in order to perform actions comprising:
  analyzing a document that is being composed by a visually impaired user, wherein the analysis derives a sensitivity of the document;
  retrieving a vocal characteristic corresponding to the derived sensitivity based on one or more predefined settings;
  retrieving an additional vocal characteristic corresponding to a size of an audience intended to receive the document; and
  audibly reading text from the document to the visually impaired user with a text to speech process utilizing both the retrieved vocal characteristic and the additional vocal characteristic.

8. The information handling system of claim 7 wherein the vocal characteristic is a speaker gender and the additional vocal characteristic is a speaker volume.

9. The information handling system of claim 7 wherein the analyzing further detects an intended message that includes the document and an audience relationship between the visually impaired user and one or more members of the audience, and wherein the additional voice characteristic also corresponds to the audience relationship.

10. The information handling system of claim 7 wherein the derived sensitivity is based on one or more aspects from a group that includes confidentiality, offensiveness, social convention, ethnicity, and age.

11. The information handling system of claim 7 wherein the document is a message intended to be sent to one or more recipients in a social networking system, the actions further comprising:
  receiving the document from the visually impaired user;
  applying one or more natural language processing (NLP) techniques to derive the sensitivity of the document;
  marking one or more areas of the document with one or more document tags that indicate the derived sensitivity of the corresponding areas;
  retrieving the vocal characteristic corresponding to the derived sensitivity and a second vocal characteristic corresponding to non-sensitive areas of the document; and
  wherein the audibly reading of the text includes reading the areas marked with the document tags with the vocal characteristics that correspond to the derived sensitivity, and reading the areas not marked with the document tags with the second vocal characteristics.

12. The information handling system of claim 11 wherein the social networking system is selected from a group consisting of an instant messaging (IM) system, a short message services (SMS) system, a blog-based system, a website, a social media community system, a news feed system, an email system, and a voice-over IP (VoIP) system.

13. A computer program product stored in a computer readable storage medium, comprising computer program code that, when executed by an information handling system, performs actions comprising:
  analyzing a document that is being composed by a visually impaired user, wherein the analysis derives a sensitivity of the document;
  retrieving a vocal characteristic corresponding to the derived sensitivity based on one or more predefined settings;
  retrieving an additional vocal characteristic corresponding to a size of an audience intended to receive the document; and
  audibly reading text from the document to the visually impaired user with a text to speech process utilizing both the retrieved vocal characteristic and the additional vocal characteristic.

14. The computer program product of claim 13 wherein the vocal characteristic is a speaker gender and the additional vocal characteristic is a speaker volume.

15. The computer program product of claim 13 wherein the analyzing further detects an of an intended message that includes the document and an audience relationship between the visually impaired user and one or more members of the audience, and wherein the additional voice characteristic also corresponds to the audience relationship.

16. The computer program product of claim 13 wherein the derived sensitivity is based on one or more aspects from a group that includes confidentiality, offensiveness, social convention, ethnicity, and age.

17. The computer program product of claim 15 wherein the document is a message intended to be sent to one or more recipients in a social networking system, the actions further comprising:
  receiving the document from the visually impaired user;
  applying one or more natural language processing (NLP) techniques to derive the sensitivity of the document;
  marking one or more areas of the document with one or more document tags that indicate the derived sensitivity of the corresponding areas;
  retrieving the vocal characteristic corresponding to the derived sensitivity and a second vocal characteristic corresponding to non-sensitive areas of the document; and
  wherein the audibly reading of the text includes reading the areas marked with the document tags with the vocal characteristics that correspond to the derived sensitivity, and reading the areas not marked with the document tags with the second vocal characteristics.

* * * * *